Patented Sept. 28, 1943

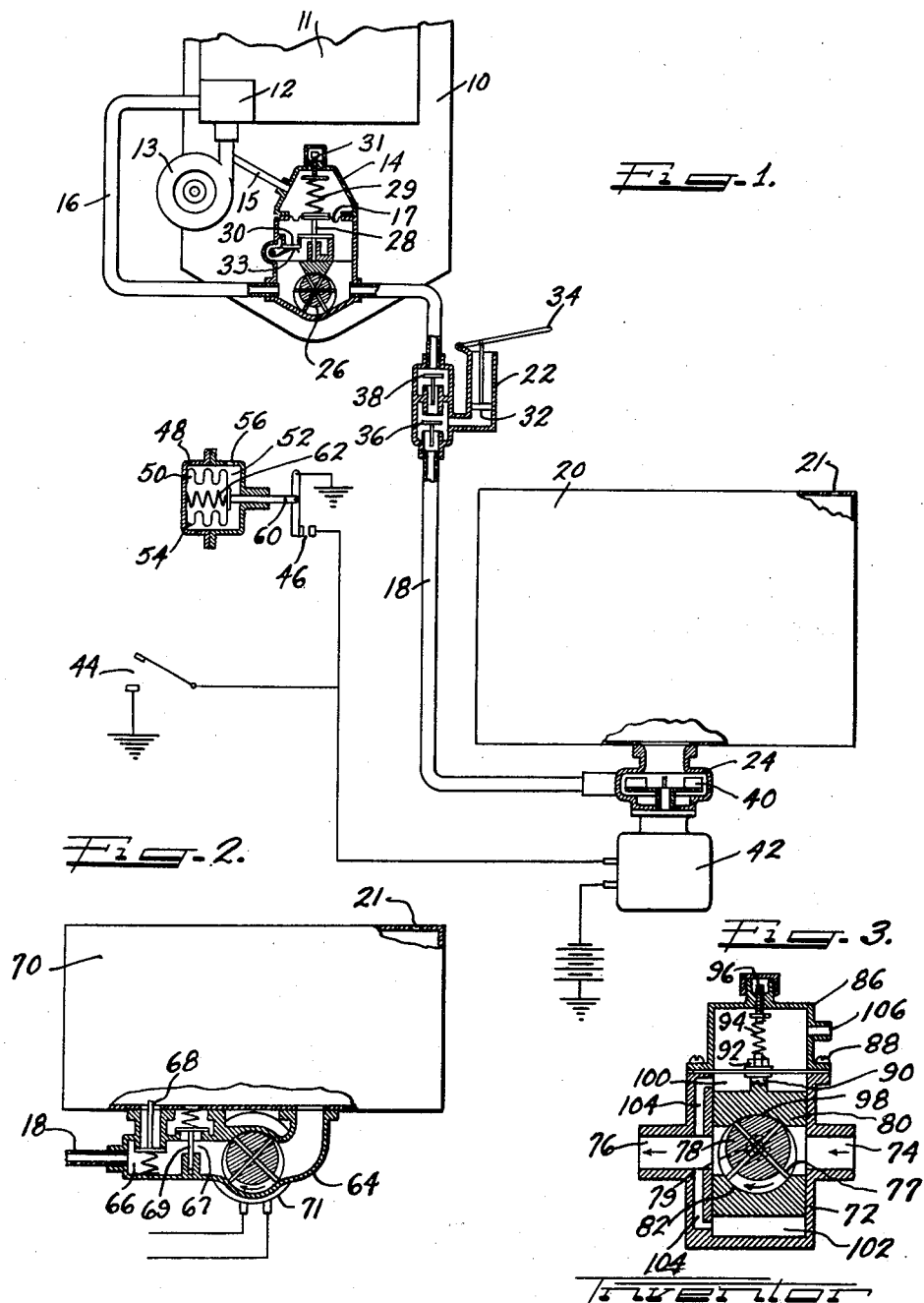

2,330,558

UNITED STATES PATENT OFFICE 2,330,558

HIGH ALTITUDE FUEL SYSTEM FOR AIRCRAFT

Russell R. Curtis, Dayton, Ohio, assignor to Curtis Pump Company, Dayton, Ohio, a corporation of Ohio Original application March 18, 1940, Serial No. 324,658. Divided and this application July 10, 1943, Serial No. 494,163

5 Claims. (Cl. 158—36.4)

This invention relates to aircraft engine fuel systems and is particularly designed for use in high altitudes.

This application is a division of my copending application Serial No. 324,658 filed March 18, 1940 entitled: "High altitude fuel system for aircraft."

It is well known in the art that, at high altitudes, the pressure on the inlet side of the engine's fuel pump becomes so depressed that the fuel vaporizes and the pump is, of course, incapable of raising it to the engine, this condition being usually termed vapor lock, and while various systems have been heretofore proposed to obviate this difficulty, they have thus far resulted in increasing rather than reducing the hazard of fuel system failure.

It is therefore an object of this invention to provide a high altitude fuel system for aircraft wherein failure of capacity to get fuel to the engine is practically impossible.

In aircraft fuel systems, as now arranged, a power pump is provided which is usually, though not always, driven directly by the engine, and a hand pump is connected, preferably but not necessarily, in the supply line on the suction side of the power pump, both of these pumps having means to bypass fuel flowing from the fuel tank to the engine, whereby the power pump may draw fuel through an inoperative hand pump, or the hand pump may force fuel through a stalled, broken, or partly incapacitated power pump.

Fuel tanks in aircraft are usually remotely located with respect to the power pump, with the result that the ever changing angles which the craft assumes in flying, constantly vary the suction head on the intake side of the power pump, and, since the pressure on the discharge side of the power pump must remain constant, a relief valve is incorporated for returning the excess capacity from the discharge to the intake side.

An ordinary spring load relief valve, however, will not hold the discharge pressure constant where there is a constantly varying suction head as above mentioned, because the forces acting against the spring to open the valve are the sum of the discharge pressure pushing the valve open on one side and the suction drawing the valve open on the other side, whereby, when the suction head constantly varies, the discharge pressure will, of course, vary.

It is therefore desirable, in a fuel system of this kind, to employ a balanced relief valve, preferably, though not necessarily, built into the power pump and spring biased to closed position, whereby, when the suction head increases, the increased suction, tending to oppose the spring and open the valve, will be opposed and balanced by the same suction, applied in the opposite direction to a balancing diaphragm which tends to aid the spring to close the valve, whereby the tension of the spring alone determines the closing force for the relief valve. Such a balanced relief valve is shown in my copending application Serial No. 284,263, now Patent No. 2,268,804 issued January 6, 1942. It includes a balancing diaphragm which will maintain the discharge pressure constant in spite of these moderate variations in suction head which constantly occur from the ever changing angles which the craft assumes in flying.

An alternate arrangement intended to accomplish the same result employs a power pump of the so-called variable volume type, wherein the volume of liquid discharged therefrom to the engine carburetor is automatically regulated by a spring loaded pressure balanced diaphragm or similar device which also serves to maintain the discharge pressure constant, independent of any variation in pressure in the suction line leading to the pump.

Also, for flying at high altitudes, aircraft engines are usually equipped with superchargers for the purpose of raising the pressure in the inlet manifold to the equivalent of sea level pressure or some other desired value. Where engines are so equipped, it is necessary to provide automatic means for increasing the discharge pressure of the power pump by an amount approximately equal to the additional pressure imposed in the intake manifold of the engine by operation of the supercharger. This is accomplished by connecting a small pipe to the discharge passage leading from the supercharger, which causes any pressure generated by operation of the latter to be imposed on the upper side of the relief valve balancing diaphragm. Inasmuch as the effective area of this diaphragm is made equal to the effective area of the relief valve, such imposed pressure will be directly additive to the spring load, and will therefore cause the discharge pressure to rise by an amount equal to the pressure imposed on the intake manifold of the engine by the action of the supercharger.

It will be obvious that a similar arrangement will accomplish the same result if a variable volume pump controlled by a balancing diaphragm were to be used for the power pump.

In other words it is essential in this new and improved system that the power pump be so devised that the discharge pressure is independent of varying suction pressure between the limits of sea level pressure and the approximate vapor pressure of the fuel being pumped, and further, that the power pump be so devised as to automatically impose additional fuel pressure on the carburetor by an amount approximately equal to the discharge pressure of the engine supercharger if and when one is used.

However, when flying at high altitude, power pump failure invariably occurs when the absolute pressure on the fuel at any point in the suction line between the fuel tank and the power pump falls below the vapor pressure of the fuel, for the reason that the fuel begins to boil at the suction inlet of the power pump and the pump can therefore no longer lift it. Inasmuch as the absolute pressure on the fuel in the tank and the suction piping extending therefrom to the power pump is almost directly in proportion to the barometric pressure of the ambient air in which the aircraft is flying, it will be obvious that the altitude to which any aircraft may be flown when equipped with any of the heretofore known fuel systems is quite limited.

It is therefore another object of this invention to add an auxiliary pump in the fuel supply line on the suction side of the power pump for the purpose of maintaining sufficient pressure on the suction side to prevent vaporization at high altitude, and by which fuel may, under certain other operative conditions be forced by the auxiliary pump alone through the bypass means of both the hand and power pumps.

Inasmuch as the auxiliary pump will not be operating during all of the flying time, it must have incorporated therein, associated therewith, or inherently possess, bypass capacity whereby either the power pump or the hand pump may draw fuel freely around or through it when it is inoperative, and since the auxiliary pump is not intended to be called upon to maintain any very high pressure, and its maximum discharge pressure must be kept lower than the discharge side of the power pump is kept at high altitudes, a centrifugal pump is much to be preferred, one reason being that this type of pump has inherent bypass capacity when inoperative, and another reason being that it can be so proportioned that its discharge head changes very little with change in, or restriction of, output.

But while a centrifugal type of pump may be much preferred as an auxiliary, because of its simplicity and inherent bypass capacity, conditions may arise where it may be advisable to include additional bypass means either around or through the centrifugal pump, or under other conditions a different type of pump entirely may be employed, as for instance, a piston pump which also has inherent bypass capacity although only in one direction, i. e., from the tank to the engine, or an offset rotor vane pump with a separate bypass means.

While the auxiliary pump is primarily intended to augment the pressure on the suction side of the power pump at high altitude to prevent vapor lock, it may be used also on take-off to insure against power pump or relief valve failure, or, in flight, it may be used in conjunction with, or instead of, the hand pump upon partial or complete failure of the power pump.

It is therefore another object of this invention to provide means whereby the auxiliary pump may be cut in manually, as for instance, in the case where it is used to perform the work of the hand pump, as well as means for bringing it in automatically as, for instance, where it is needed at high altitude to prevent vapor lock.

Other objects will become apparent as the invention is further described, reference being made to the drawing, wherein, Fig. 1 is a schematic illustration of the invention.

Fig. 2 shows a modification of the auxiliary pump structure.

Fig. 3 shows a modified form of power pump.

The fuel system, shown in the drawing, comprises an engine 10 having an intake manifold 11, a carburetor or functionally similar device 12, a supercharger 13 discharging into the carburetor intake, and a power pump 14, driven in the instant case by the engine, the output side of the supercharger being connected by a small pipe 15 to the space above the relief valve balancing diaphragm 17 of the power pump. A discharge pipe line 16 connects the output side of the pump 14 to the carburetor 12, while a suction pipe line 18 connects the inlet side of the pump to the bottom of the fuel tank 20, the top of the tank being provided with a vent 21. An emergency hand pump 22 of the conventional design is connected in the suction line 18 between the power pump and the fuel tank, while an auxiliary pump 24 is connected in the line between the hand pump and the tank, the sequence named being that preferably adopted, although some departure therefrom may under certain circumstances, be allowed.

The power pump 14 may preferably be of the type shown in my copending application Serial No. 284,263, filed July 13, 1939, now Patent No. 2,268,804 issued January 6, 1942. It includes an offset rotor 26 of the sliding vane type, and a one way relief valve 28 biased by a spring 29 to its closed position, the spring being adjustable by a screw 31. The relief valve allows excess fuel at the pressure selected by adjustment to return from the discharge to the intake side of the pump. A one way by-pass valve 30 is constructed to allow fuel to pass from the suction to the discharge side of the pump, this valve also being spring biased to closed position by a light spring 33.

The hand pump 22 may be conventional, the schematic diagram showing a piston 32, operable by a handle 34, and an intake valve 36 and discharge valve 38. Obviously, no special by-pass means is required, since fuel may, when required to do so, flow through the hand pump from the tank 20 to the carburetor 12 by raising both the intake valve 36 and discharge valve 38.

The auxiliary pump 24 is of the well known centrifugal type, having an impeller 40 driven by a small electric motor 42, the inlet side of the pump being, in the instant case, connected directly to the bottom of the tank, and the discharge side to the pipe line 18, although it may be otherwise connected to the tank, a requisite being that the auxiliary pump be always below the hydraulic gradient of the system. As is well known, fluid may be passed by gravity or other external force in either direction through a centrifugal pump quite freely while the impeller is not rotating.

In order that the auxiliary pump 24 may be operated at will for take-off, or for assisting the power pump in an emergency, or for preventing vapor lock at high altitude, a hand switch 44 is provided for controlling the motor.

With this switch the auxiliary pump 24 may be operated at any time, separately, or in conjunction with either or both of the other fuel pumps at the discretion of the pilot.

A second switch 46 for controlling the motor 42 is automatically operative by drop in atmospheric pressure.

Switch 46 is controlled by mechanism comprising a casing 48 having its interior separated into two chambers 50 and 52 by a metal bellows 54, the chamber 50 being evacuated after being sealed against leakage by soldering, brazing, or similarly securing its open end to the inner wall of the casing and the chamber 52 being connected by an opening 56 to the atmosphere.

A switch operating rod 60 is slidable through a hub in the wall of the chamber 52, its inner end being connected to, and movable by, the bellows 54, while its outer end is connected to the movable part of the switch 46. The switch 46 is normally held in open position by the atmospheric pressure existing at moderate altitude, but will be closed by the spring 62 upon a given rise in altitude and the corresponding drop in said atmospheric pressure. The altitude at which the switch 46 will be closed, is of course selected at a safe value below that at which vapor lock may occur.

The modification shown in Fig. 2, comprises an auxiliary pump 64 of the offset rotor sliding vane type, but since this pump is not inherently capable of by-passing fuel, and is subject to a sharp rise in discharge pressure when its output is restricted, separate by-pass means 66 and separate relief valve means 67 are provided. The relief valve means 67 includes a check valve 69 connecting the discharge side of the pump to the tank, the valve being spring biased to closed position and capable of passing excess fuel from the discharge side back to the tank.

The by-pass means 66 includes a check valve 68 connecting the tank 70 to the pipe line 18, the check valve being arranged to allow outward flow only from the tank to the pipe line, and while the by-pass means 66 and relief means 67 are here shown as parts of the pump 64, it will be apparent that they may easily be made separately and joined thereto. A small motor 71 is provided for operating the pump.

The so-called variable volume power pump, illustrated in Fig. 3, and suggested as a possible substitute for the power pump 14, comprises a body 72 with suction and discharge openings 74 and 76 respectively, vanes 77 slidable in a rotor 78 which is rotatable in bearings 79 fixed in the frame, and a cylinder 80 having an offset bore 82 and a rectangular exterior contour slidable vertically in the frame.

The upper end of the frame is closed by a diaphragm 84 and a cap 86 held on by screws 88. A stem 90 extends upwardly from the cylinder 80 and is secured to the diaphragm by nuts 92. A spring 94 with adjusting screw 96 urges the cylinder 80 downward to maintain a seal at 98. The spaces 100 and 102 above and below the cylinder 80 are connected to the discharge passage by conduits 104 thereby neutralizing any tendency of the discharge pressure to unseat the seal 98, leaving the seal dependent wholly on the force of the spring 94.

Excess pressure at restricted capacity is prevented by slippage past the seal 98 when the pumped pressure exceeds that for which the spring 94 is adjusted. The supercharger connection 106 is provided, whereby the supercharger pressure is additive to the force of the spring 94 in the same manner as described relative to the power pump 14. Obviously, change in suction head does not materially affect the discharge pressure.

*Operation*

When flying at moderate altitudes, the power pump 14 is entirely capable of raising the fuel against the normal suction head in line 18 and delivering it to the carburetor 12 under the necessary pressure. Any change in the rate of fuel consumption is taken care of by the relief valve 28, and any normal variation in the suction head between the fuel tank and power pump, due to the change in height of the tank relative to the power pump, as the aircraft climbs or dives, is taken care of by the balancing mechanism in the relief valve, by which the pressure in the discharge line 16 is kept constant regardless of any change in pressure in the suction side of the pump.

If, in any case, the power pump 14 fails to deliver the required fuel pressure, the hand pump 22 may be used in its place as in present practice, pumping through the power pump and the auxiliary pump, or, if that altitude has been reached for which the automatic switch 46 has been set, the auxiliary pump will become operative, through operation of that switch, or, if the automatic switch 46 has been omitted or is for any reason inoperative, the auxiliary pump 24 may be brought into play by the hand switch 44 to supplement the hand pump 22, or, in certain cases, in low altitude flying, the auxiliary pump 24 alone may provide the necessary fuel, pumping through both the hand and power pumps.

In high altitudes, however, the drop in atmospheric pressure, acting on the fuel in the tank 20, correspondingly lowers the pressure in the suction pipe 18, until finally, upon continued increase in altitude, the fuel starts to vaporize at the power pump intake and the power pump can no longer raise it.

Before this occurs, however, the pilot may close the switch 44 to start the motor 42, or, if he does not sooner do so, the increasing altitude will finally cause such a drop in atmospheric pressure in the chamber 52 of the automatic switch 46 as will allow the spring 62, which is tensioned to operate at an altitude below that at which vapor lock occurs, to close the switch 46 thereby starting the motor 42 and operating the auxiliary pump 24, and thereby raising the pressure in the suction line before vapor lock occurs.

Summarizing some of the more desirable conditions of the combination of elements in the herein described fuel system, it should be noted first, that as far as is now known, no auxiliary pump would be highly effectively except in combination with a power pump having a balanced relief valve or its equivalent, for otherwise any change in suction head, effected by the auxiliary pump, would change the discharge pressure at the power pump; second, that the auxiliary pump may not at any time deliver fuel to the power pump at a maximum pressure higher than the discharge pressure of the power pump, for if it did, the discharge pressure of the power pump would be raised through the power pump bypass by the auxiliary pump; it should be borne in mind, however, that the discharge pressure of the power pump is ordinarily increased at high altitudes that require the use of the auxiliary pump by reason of the action of the supercharger and that the discharge pressure of the auxiliary pump may therefore be greater than the normal power pump discharge pressure employed while flying at lower altitude where the auxiliary pump is ordinarily not operated; third, that the auxiliary pump structure should preferably be such that should its output be reduced to zero while under rotation, no very great rise in pressure will result at its output side; fourth, that the auxiliary pump should be below the hydraulic gradient of the fuel tank.

I claim:

1. A fuel system comprising a fuel tank, carburetor, a fuel line from said tank to said carburetor, a fuel pump in said fuel line, an auxiliary pump in said fuel line between the inlet to the fuel pump and the tank for augmenting fuel pressure to the inlet of the fuel pump, both of said pumps having passes associated therewith for passage of fuel from the tank to the carburetor even when only one of said pumps is operating, independent driving means for each pump, and a device operated in one direction by air pressure and in the reverse direction by fuel pressure associated with said fuel pump to maintain a constant pressure differential between the fuel pressure at the carburetor inlet and the air pressure existing at the point where the fuel is introduced into the air for forming a combustible mixture.

2. An engine fuel system comprising a fuel reservoir, an air and fuel mixing device, an engine-driven fuel pump for pressuring fuel to said mixing device, a booster pump for delivering fuel from said reservoir under pressure to the inlet of said fuel pump, means independent of said engine for driving said booster pump, both of said pumps having passes associated therewith for passage of fuel from the tank to the mixing device even when only one of said pumps is operating, and a balanced relief valve assembly cooperating with said fuel pump to maintain a constant pressure differential between the fuel pressure at the inlet of the mixing device and the air pressure existing at the point where fuel is admixed with air for forming the combustible feed mixture for the engine.

3. A fuel system comprising a fuel tank, a carburetor, a fuel line from said tank to said carburetor, a fuel pump in said fuel line, an auxiliary pump in said fuel line between the inlet to the fuel pump and the tank for augmenting the fuel pressure at the inlet of the fuel pump, bypass means around both pumps to permit passage of fuel from the tank to the carburetor even when only one of said pumps is operating, independent drive means for each pump, and a balancing mechanism sensitive to air pressure and fuel pressure associated with said fuel pump to maintain a constant pressure differential between the fuel pressure at the carburetor inlet and the air pressure existing at the point where the fuel is introduced into the air for forming a combustible mixture, said mechanism being operable to relieve fuel from the discharge side of the fuel pump back to the inlet side of the fuel pump in amounts for maintaining said constant pressure differential.

4. A fuel system adapted to an aircraft engine comprising a fuel reservoir, an air and fuel mixing device, an air supercharger for discharging air into the mixing device, a fuel line from the reservoir to the mixing device, an engine-driven fuel pump in said fuel line, bypass means around the fuel pump, an electric motor driven centrifugal booster pump having an inlet communicating with said reservoir at a level to receive fuel by gravity flow from the reservoir, said booster pump having an outlet communicating with the inlet side of said fuel pump, said inlet and outlet of the booster pump being in constant communication to permit free fuel flow to the fuel pump even when the booster pump is idle, and a balanced relief valve assembly subjected to supercharger discharge pressure on one side and to fuel pump discharge pressure on the other side, said assembly including a relief valve between the outlet and inlet sides of the fuel pump for maintaining a constant pressure differential between the fuel pressure at the mixing device inlet and air pressure existing at the point where fuel is introduced into the air to form the combustible mixture for the engine, whereby the relief valve is operated to release fuel from the discharge side of the fuel pump back to the inlet side of the pump in amounts sufficient to maintain said constant pressure differential.

5. An aircraft engine fuel system which comprises a fuel tank, a centrifugal type pump having an inlet in communication with the lower portion of the tank to receive fuel by gravity flow from the tank, said centrifugal pump having an outlet in constant communication with said inlet adapted to receive fuel from the tank even when the pump is inoperative, a single fuel line extending from the discharge side of said centrifugal pump, an engine-driven positive displacement pump having an inlet receiving said fuel line, an engine carburetor, said fuel pump having a discharge outlet communicating with said carburetor, a bypass valve in said fuel pump adapted to be opened by pressured fuel from the centrifugal pump for joining the inlet and outlet of the fuel pump when the fuel pump is inoperative, a relief valve in said fuel pump adapted to join the outlet and inlet sides of the fuel pump, and a balancing mechanism for said relief valve operative to control the valve for maintaining a constant pressure differential between the fuel pressure at the carburetor inlet and the air pressure existing at the point where fuel is introduced into the air for forming the combustible fuel mixture for the engine.

RUSSELL R. CURTIS.